2 Sheets--Sheet 1.

B. F. FOREMAN & J. P. SPECK.
Bolts for Flour and Middlings.

No. 137,430. Patented April 1, 1873.

WITNESSES:

INVENTOR
Benjamin Franklin Foreman
John Peter Speck
By Knight Bros
Attorneys

2 Sheets--Sheet 2.

B. F. FOREMAN & J. P. SPECK.
Bolts for Flour and Middlings.

No. 137,430. Patented April 1, 1873.

WITNESSES.
Jas. L. Ewin
Walter Alien

INVENTOR.
Benjamin Franklin Foreman
John Peter Speck
By Knight Bros
Attorneys

UNITED STATES PATENT OFFICE.

BENJAMIN F. FOREMAN AND JOHN P. SPECK, OF UPTON, PENNSYLVANIA.

IMPROVEMENT IN BOLTS FOR FLOUR AND MIDDLINGS.

Specification forming part of Letters Patent No. 137,430, dated April 1, 1873; application filed December 28, 1872.

*To all whom it may concern:*

Be it known that we, BENJAMIN FRANKLIN FOREMAN and JOHN PETER SPECK, both of Upton, in the county of Franklin and State of Pennsylvania, have invented an Improved Bolt for Separating Flour and Middlings, of which the following is a specification:

Nature and Objects of our Invention.

Our invention is principally designed for the separation of the constituent parts of middlings; and consists, essentially, of a series of bolts, of which each one has an interior fan or blast provided with a register and an annular sieve, together with suitable conveyers and with discharging-passages for the delivery of the separated portions, and returning-passages for the working over of the portions not sufficiently separated.

Our contrivances are especially designed to separate the fine middlings or flour from the coarse ones before the latter are affected by the blast, which separation is effected as soon as the middlings enter the reel by an arrangement of cloth upon the reel surrounding the fan. We thus avoid drawing away the light bran and specks, and also the small particles of flour, and which, in existing machines of this class, renders the separation of these portions imperfect, as experience has shown. Further, the arrangement and construction of our fan-register and fan-spout are such as to enable us to direct the blast with any desired velocity, so as to prevent small specks passing through the cloth. By the hereinafter-described arrangement of our inclosed fan and the annular sieve around the inside of the reel the heavier middlings, becoming too heavy for the blast, sift or drop through, while the lighter portions of the middlings are carried forward and are conveyed to second or third reel and thus separated, the portions not separated being afterward returned to the first reel for a second cleaning.

General Description.

Figure 1:
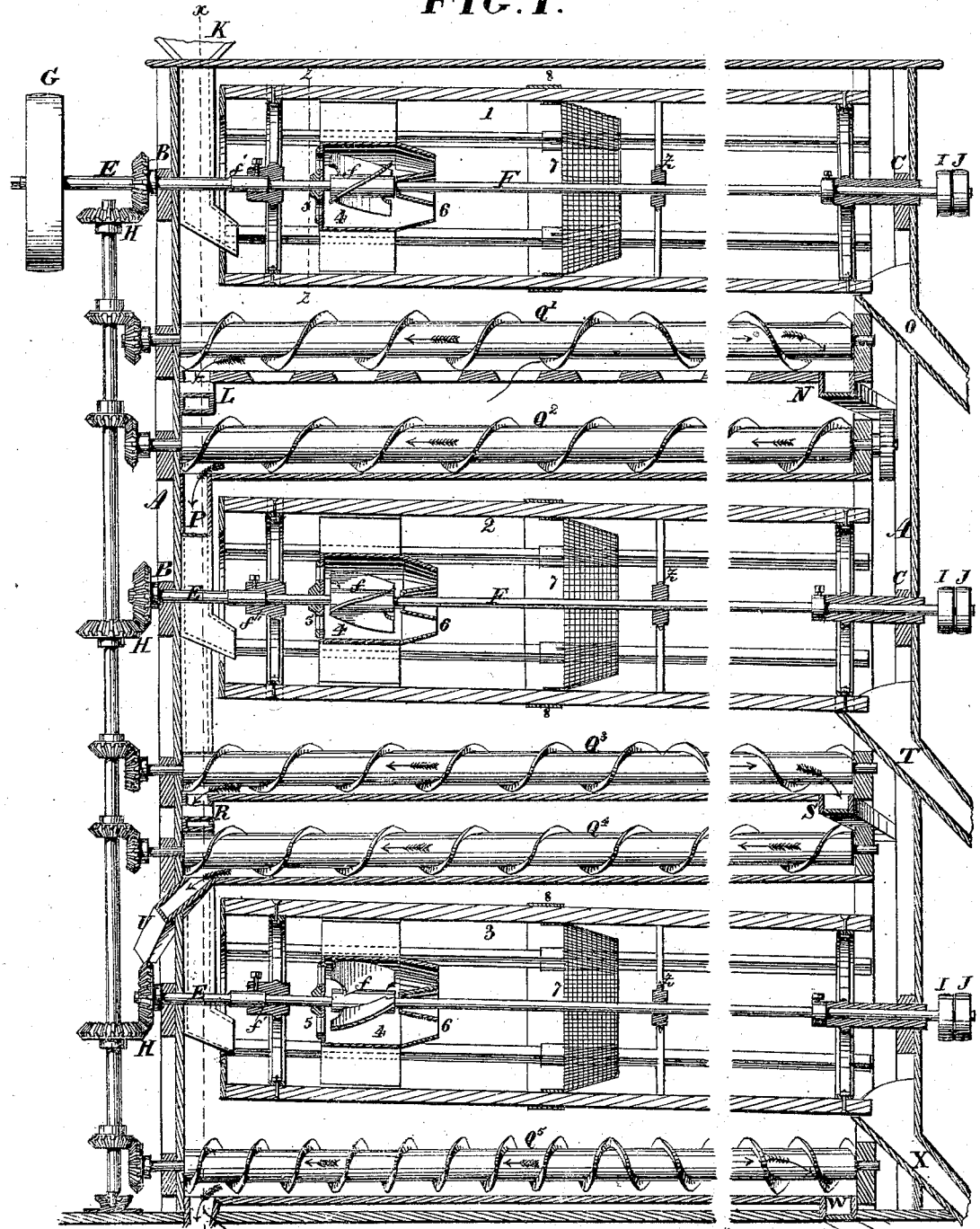
Figure 2:
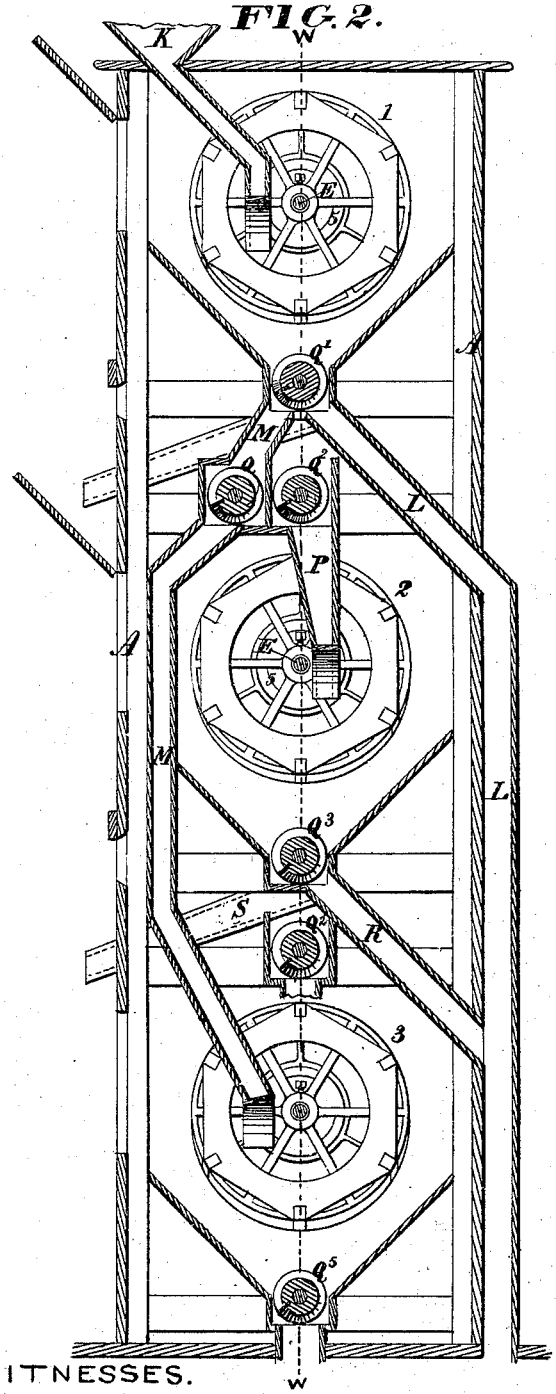
Figure 3:
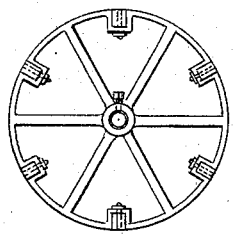
Figure 4:
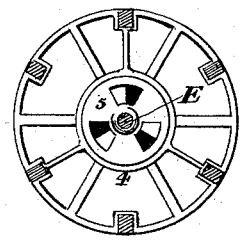

Figure 1 is a section in the common axial plane $w\ w$, Fig. 2, of a series of bolting-reels and their appurtenances embodying our invention. Fig. 2 is a transverse section of the same in the line $x\ x$, Fig. 1. Fig. 3 is an end view of one of the reels. Fig. 4 is a transverse section of a reel on the line $z\ z$, Fig. 1.

A is a vertical frame provided with bearings B and C for the reel-shafts E and for the fan-shafts F, which shafts socket one into the other at $f'$, so as to remain in line, yet be capable of independent rotation. Each fan-shaft carries a fan, $f$, having oblique blades, and situated interiorly within the reel. 1, 2, and 3 constitute collectively the vertical range or series of reels. The upper reel-shaft has a driving-pulley, G, and its motion is transmitted to the reel-shafts below it by means of suitable geared connection H. Each fan-shaft has a distinct and separate driving-pulley, I, and loose pulley J. K is the spout from an elevator or receiving-spout from lower reel. L is spout from part of first conveyer to barrel or hopper-boy. M is spout from side conveyer, feeding returns from tail end of upper conveyer to third reel. N is a spout to conduct feed from upper conveyer. O is a spout to conduct feed from upper reel. P is a spout to conduct middlings under head of second conveyer. $Q^1$ $Q^2$ $Q^3$ $Q^4$ $Q^5$ are conveyers, of which the conveyers $Q^1$, $Q^3$, and $Q^5$ are formed to feed from their mid-lengths both forward and backward. R is spout from head of conveyer $Q^3$. S is spout to conduct from tail of conveyer $Q^3$. T is spout to conduct from end of reel 2. U is a spout to convey purified middlings to barrel or "burrs." V is a spout to conduct returns to elevator for upper reel 1. W is a spout which conducts from tail of conveyer $Q^5$. X is a spout which conducts from reel 3. Z is a spider at or near center of reel. 4 is a cylinder which incloses the fan $f$, said cylinder being attached to the inner side of the reel-ribs. 5 is a register for regulating the blast. The said cylinder has a conical ventage, 6, for concentrating the blast action along the axis of the cylinder. 7 is a wire sieve in the form of a conical annulus, which is attached to the inside of the reel so as to point rearward, as shown. 8 is a band of drilling around the reel in front of the annulus for the escape of specks where the strength of the blast would be liable to drive them through the ordinary cloth.

The incased fan and the annular sieve may be made adjustable longitudinally in the reel.

*Operation.*

The purpose of the inclosed fan within the reel is to have entire control of the blast, which in our arrangement not only acts upon the middlings on the lower side of the sieve, but all around it, thus driving all small and light particles of feed or bran to the rear end of said reel, preventing it from settling upon cloth and passing through it into purified middlings. We prefer to make part of the sieve next the cloth of solid brass sheeting or some other suitable article, so as to drive or elevate all the middlings a little before allowing any to pass through the sieve onto the coarse cloth under it. This is done to prevent the blast from forcing small specks through the bottom, or that part of the sieve next the ribs and cloth. If left porous, some small specks might force through and would then pass in with the pure middlings, which middlings, after passing through cloth, fall into upper conveyer. From that they fall into second conveyer, and are then conducted to head of second reel, where they pass through a similar ordeal, the same as in first reel, after which they become perfectly pure. They are then conducted into the flour or are sent to burrs to be ground over.

The object of the third reel is to purify such middlings as may pass over sieve in first and second reel, and yet be too rich for feed. The course they take after passing through cloth on upper reel is into part of upper conveyer; from there to side conveyer, onto head of lower reel. After passing through it they are elevated and conducted into head of upper reel again, and so on alternately until they become pure also.

The elevator employed to return the middlings to the first reel may be of common construction, and a specific description thereof is not deemed necessary.

*Claims.*

We claim as new and of our invention—

1. The annular sieves 7, constructed and applied within the reels, substantially as described, for the purposes set forth.

2. The combination with the sieve 7 of the double-acting conveyer $Q^1$ and conveyer $Q^2$, arranged substantially as set forth.

3. The combination or arrangement of reels 1, 2, and 3, interior inclosed fans $f$, and annular sieves 7, for the purpose set forth.

4. The combination of the reels 1 2 3, fans $f$, sieves 7, conveyers $Q^1$ $Q^2$ $Q^3$ $Q^4$ $Q^5$, and the successive spouts, all arranged to operate as set forth, for the purposes explained.

B. F. FOREMAN.
JOHN P. SPECK.

Witnesses:
J. COOK,
GEO. W. FRYE.